(12) United States Patent
Collier

(10) Patent No.: US 11,198,275 B2
(45) Date of Patent: Dec. 14, 2021

(54) SOLAR POWERED SWITCHABLE GLASS SYSTEM

(71) Applicant: KARMA AUTOMOTIVE LLC, Irvine, CA (US)

(72) Inventor: Timothy Ryan Collier, Carlsbad, CA (US)

(73) Assignee: KARMA AUTOMOTIVE LLC, Irvine, CA (US)

( * ) Notice: Subject to any disclaimer, the term of this patent is extended or adjusted under 35 U.S.C. 154(b) by 0 days.

(21) Appl. No.: 16/670,273

(22) Filed: Oct. 31, 2019

(65) Prior Publication Data

US 2021/0129500 A1 May 6, 2021

(51) Int. Cl.
| | |
|---|---|
| *B32B 17/10* | (2006.01) |
| *G02F 1/1337* | (2006.01) |
| *B60L 8/00* | (2006.01) |
| *B60R 1/00* | (2006.01) |

(52) U.S. Cl.
CPC ........ *B32B 17/10504* (2013.01); *B60L 8/003* (2013.01); *B60R 1/001* (2013.01); *G02F 1/1337* (2013.01)

(58) Field of Classification Search
CPC ............... B60R 1/001; B32B 17/10504; G02F 2001/13324; G02F 1/1334; G02F 1/13324; B60L 8/003; F21S 41/645; F21S 41/153; F21S 41/255; F21S 41/143
See application file for complete search history.

(56) References Cited

U.S. PATENT DOCUMENTS

| | | | |
|---|---|---|---|
| 8,995,039 B2 | 3/2015 | Bartug et al. | |
| 2011/0199563 A1* | 8/2011 | Fontecchio | ........... G02F 1/1334 349/116 |
| 2013/0092457 A1 | 4/2013 | Wecker et al. | |
| 2018/0342977 A1* | 11/2018 | Nania | .................... B62D 65/06 |
| 2019/0041680 A1* | 2/2019 | Yoshida | .............. G02F 1/13306 |
| 2019/0235822 A1* | 8/2019 | Lim | ........................ G09G 5/36 |
| 2020/0070676 A1* | 3/2020 | Miller | ................... H02J 7/0022 |

* cited by examiner

*Primary Examiner* — Mariam Qureshi
(74) *Attorney, Agent, or Firm* — Gordon Rees Scully Mansukhani, LLP

(57) ABSTRACT

A self-powered laminated switchable glass system. The laminated switchable glass system having an interior and exterior tempered glass layer. A transparent luminescent solar concentrator layer and a switchable glass film layer is disposed between the exterior and interior glass layer. The solar layer provides power to the switchable glass film layer to allow selective opacity of the switchable glass film.

16 Claims, 5 Drawing Sheets

SOLAR POWERED SWITCHABLE GLASS SYSTEM

The present application relates to glass for a vehicle and, in particular, a switchable or selectable glass film with a transparent luminescent solar concentrator that provides power to the film and can be installed in an automobile.

A vehicle, such as an automobile, includes glass on the windscreen, side and rear windows and may include glass on the roof. With the increase of transparent glass materials in vehicles, drawbacks such as poor temperature regulation, upholstery degradation, lack of privacy, and lower security becomes a large concern for vehicle owners.

The system disclosed herein controls the amount of visible, ultraviolet, and infrared light from the sun in order to provide improved vehicle cabin temperature regulation, upholstery preservation, privacy, and security. The combination of a transparent luminescent solar concentrator and a switchable glass film in automotive glass applications provides a self-powered glass system.

The disclosed system includes the combined use of a transparent luminescent solar concentrator along with switchable glass films in automotive glass applications. Transparent luminescent solar concentrator absorbs ultraviolet and infrared light and converts it into electricity. The switchable glass film in tandem with the transparent luminescent solar concentrator blocks most of the wavelengths of light.

Accordingly, an object of the system disclosed herein is to provide a self-powered switchable glass system. The disclosed system may have broad applicability including use outside of the automotive industry such as, for example, in buildings, houses and other structures including windows.

BRIEF DESCRIPTION OF THE DRAWINGS

The features, aspects, and advantages of the present invention will become apparent from the following description, and the accompanying exemplary embodiments shown in the drawings, which are briefly described below.

DETAILED DESCRIPTION

According to one disclosed embodiment, a vehicle glass panel such as a windscreen, side windows, rear windows or roof may include a self-powered switchable glass system. The self-powered switchable glass system comprises of an exterior and interior tempered glass layer, a transparent luminescent solar concentrated layer, a switchable glass film layer. The solar layer and the switchable glass film layer is sandwiched between the interior and exterior tempered glass layer. The solar layer absorbs ultraviolet and infrared light and produced electricity. The switchable layer may be of electrochromic materials and other materials such as suspended-particle devices (SPD) or polymer-dispersed liquid crystal devices (PDLC). These materials are known to degrade under exposure to ultraviolet light. The solar layer be placed exterior to the switchable layer, allowing the solar layer to protect the switchable layer by absorbing the ultraviolet wavelength of light. The switchable layer would then selectively block some or all the remaining wavelengths of light as desired by the user.

Figure 1:
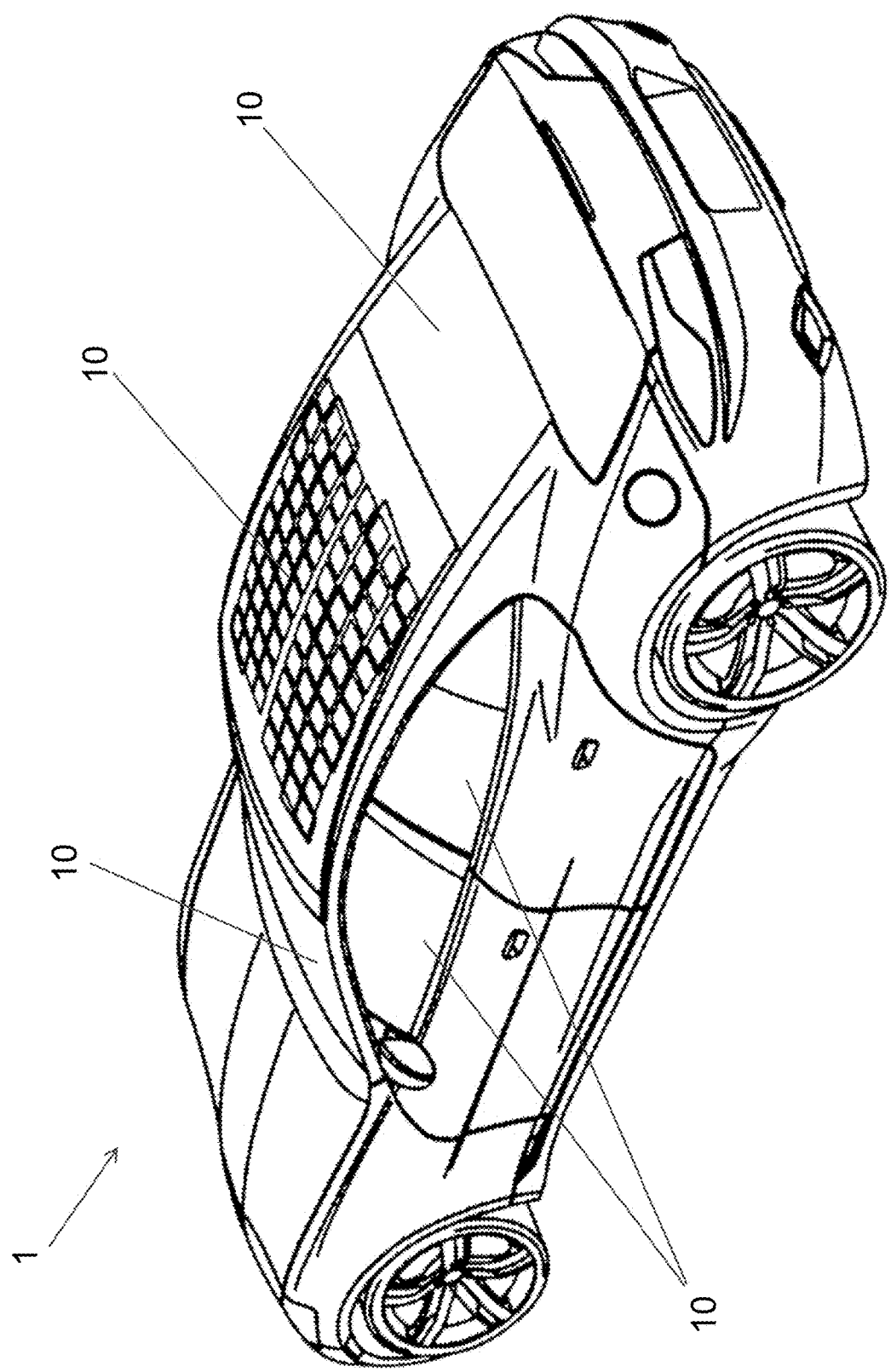
FIG. 1 is a vehicle with a switchable glass system.

FIG. 1 illustrates a vehicle 1 with a switchable glass system 10. The switchable glass system 10 may be disposed on the vehicle's windscreen, side windows, rear windows or roof. The vehicle may comprise of a main battery (not shown) powering electrical motors (not shown) that drive the wheels of the vehicle.

Figure 2:
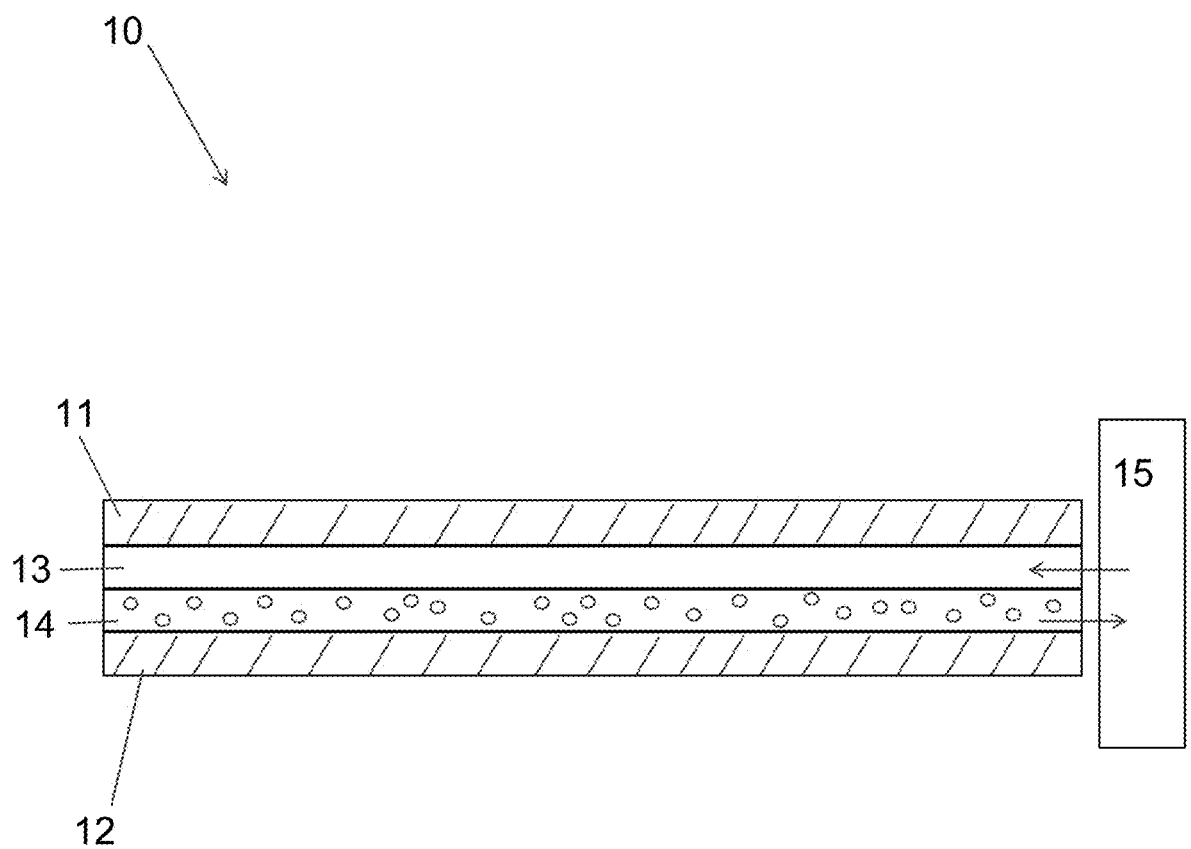
FIG. 2 is a self-powered switchable glass system.

FIG. 2 illustrates a switchable glass system 10. The switchable glass system 10 includes an exterior laminated glass layer 11 and an interior laminated glass 12, both of which may be tempered glass. The transparent luminescent solar concentrated layer 13 is placed exterior to the switchable glass film layer 14. A power source 15 configured to receive power generated from the solar layer 13 may be disposed in the vehicle of the car. The power source 15 may be an auxiliary battery configured to power the switchable glass film layer 14. The power source 15 may also be a main battery of an electric vehicle such as an accessory battery, a main propulsive battery, or a batter of a motor/generator of the vehicle. The power source 15 may also be a capacitor. The power rating of the solar layer 14 outputs enough electricity to power the switchable glass film layer, thus allowing the switchable glass system 10 to be self-sustaining. Each glass system 10 may have a dedicated auxiliary battery. For example, the windshield switchable glass system may have a separate battery from the rear windshield switchable glass system. Each switchable glass system of the vehicle may also be connected to the same battery system.

Figure 3:
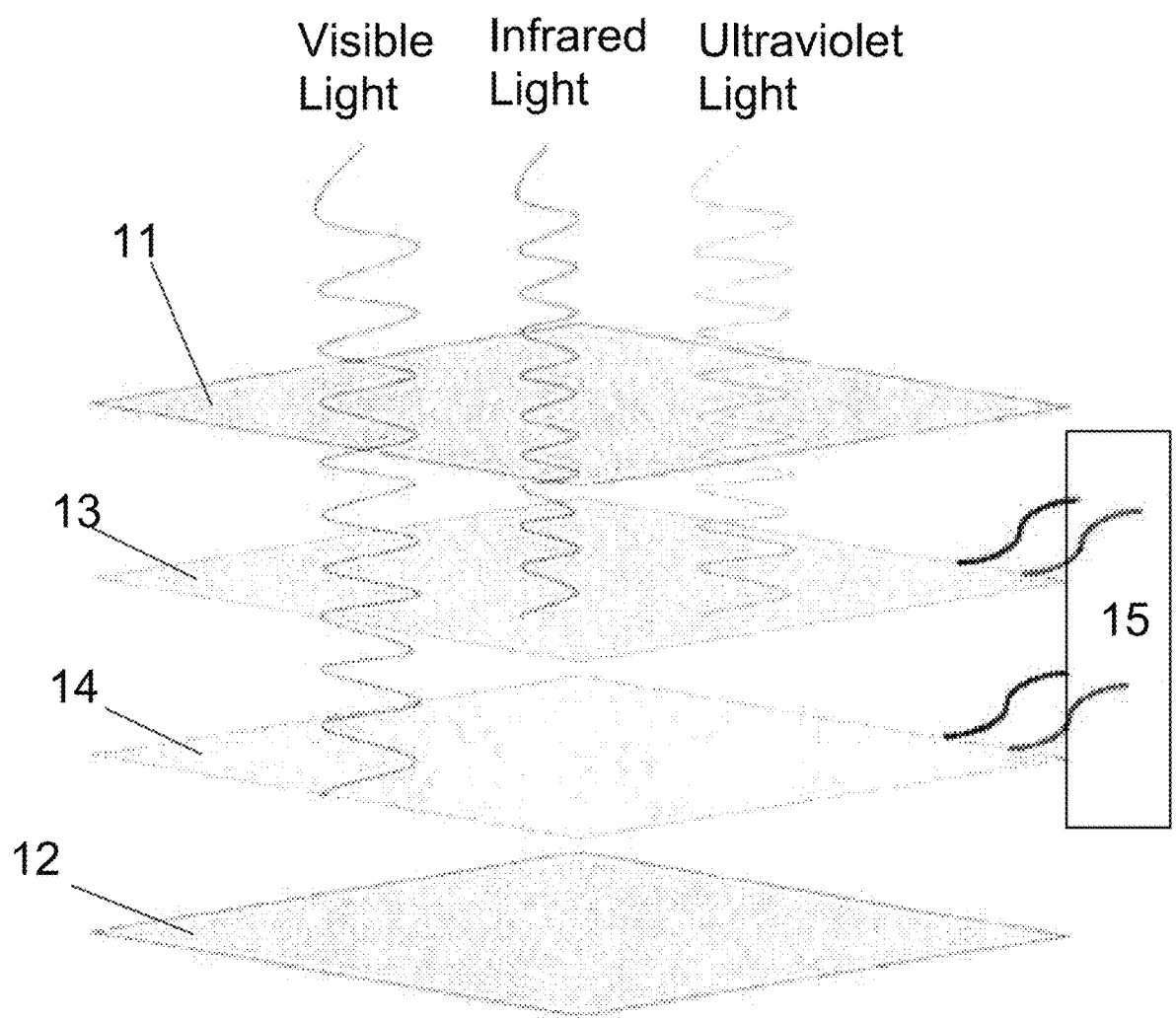
FIG. 3 is an exploded view of the self-powered switchable glass system.

FIG. 3 illustrates an exploded view of the switchable glass system 10. The solar layer 13 is capable of blocking most if not all infrared light and ultraviolet. The visible light is allowed to pass through the solar layer 13. The switchable layer's opacity may be controlled such that the user may control the amount of light entering the vehicle. The opacity of the switchable glass film layer 14 may also be controller by a controller (not shown). The controller may control the opacity of the switchable glass film layer 14 depending on the temperature of the vehicle passenger compartment via a temperature sensor or other variables such as the time of day or amount of sunlight available. The controller may be programmable to allow the user to control the behavior of the switchable glass film layer to control the amount of visible light entering the vehicle. The amount of visible light may also be controlled manually by the passenger or driver of the car via the vehicle's center console or a control switch by each of the passenger windows.

Figure 4:
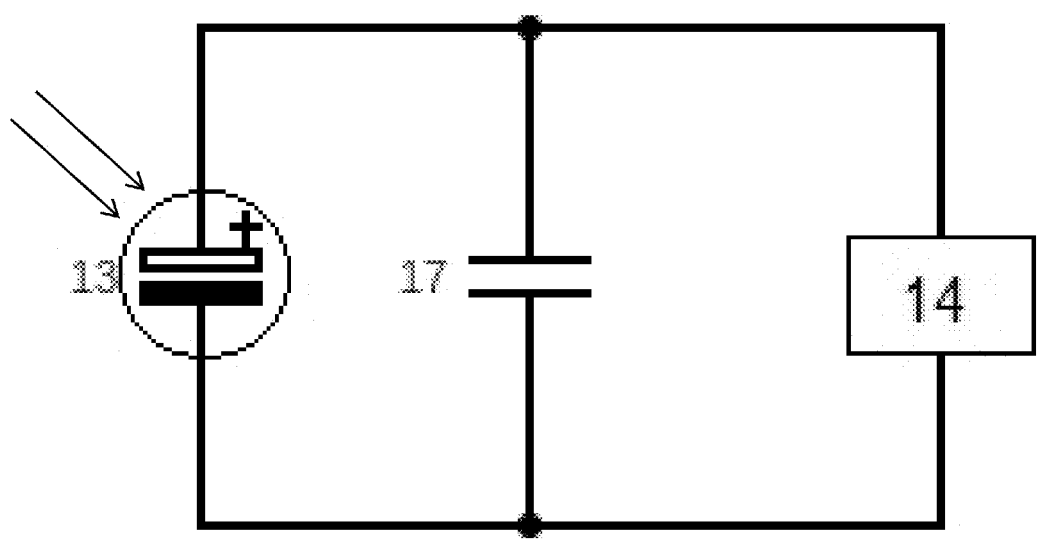
FIG. 4 is an exemplary circuit with capacitors as the power supply.

FIG. 4 illustrates an exemplary circuit with one of more capacitors such that a battery is not required to power the switchable glass film layer. This configuration allows the switchable glass system 10 to be added into existing and futures vehicles due to its compact package and self-powering system since the exemplary embodiment system does not require an external battery source (e.g., a vehicle batter). In this embodiment the switchable layer may be used whenever sunlight is available. The ability of the system to operate for extended periods of time depends on the storage capacity and size of the capacitors. However, such an embodiment may be ideal for automotive applications where typical usage of the switchable layer usually occurs in high sunlight conditions. The embodiment shown in FIG. 4 may also be preferred in other applications where the switchable layer is operating and available when sunlight is available and solar power is readily available to power the switchable layer without the need for a large capacity storage device. The exemplary circuit 20 in FIG. 4 includes a solar layer or concentrator 13 and a capacitor 17. The capacitor 17 is used as the electrical energy storage to receive power from the solar layer 13 and provide power to the switchable glass film layer 14. The capacitor 17 allows the operation of the solar layer 13 to be uninterrupted in brief moments of darkness from clouds or obstructions from the sun. The exemplary circuit 20 may include more than one capacitor 17 and the capacitor(s) 17 may be one or more supercapacitors.

Figure 5A:
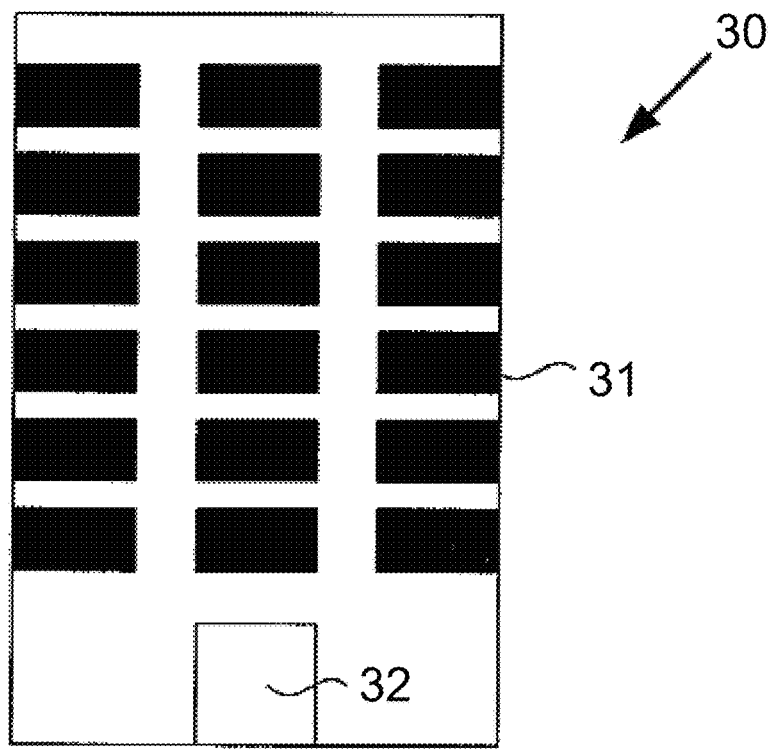
FIG. 5A shows a switchable glass system used in a commercial or residential building.
Figure 5B:
FIG. 5B shows a switchable glass system used in a residential home.

FIGS. 5A and 5B illustrate other systems in which the switchable glass system 10 may be used. As shown in FIG. 5A, a building 30 may include switchable glass system 10 located on the windows 31 or door(s) 32 of the building as shown. As shown in FIG. 5B, the switchable glass system 10 may also be located on windows 41 of a home 40. The switchable glass system 10 may be used in systems wherein shades, blinds, or curtains may be desired. The switchable glass system as described above advantageously allows greater control of the amount of light passed through while reducing reliance on external electrical power such as a conventional electrical grid, and allows for a clean, self-sustaining switchable glass system.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the switchable glass system as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. A laminated switchable glass system comprising:
an exterior glass layer, wherein the exterior glass layer comprises tempered glass;
a transparent luminescent solar concentrator layer configured to produce electricity and store the electricity in a plurality of capacitors, wherein the transparent luminescent solar concentrator layer is disposed inwards and in contact with the exterior glass layer and, wherein at least one of the plurality of capacitors is a super capacitor;
a switchable glass layer configured to receive power from the capacitors, wherein the switchable glass layer is disposed inwards and adjacent to the transparent luminescent solar concentrator layer; and
an interior glass layer disposed inwards and adjacent to the switchable glass layer, wherein the interior glass layer comprises tempered glass.

2. The switchable glass system of claim 1, wherein the switchable glass layer is one of an electrochromic device, a suspended particle device, and a polymer-dispersed liquid-crystal device.

3. The switchable glass system of claim 1, further comprising a controller configured to control an opacity of the switchable glass layer.

4. The switchable glass system of claim 3, wherein the controller is automated by a control system receiving input from a temperature sensor.

5. A vehicle comprising:
a passenger compartment;
a battery; and
the switchable glass system of claim 1, and
wherein the interior glass layer is adjacent to the passenger compartment.

6. The vehicle of claim 5, wherein the switchable glass layer is one of an electrochromic device, a suspended particle device, and a polymer-dispersed liquid-crystal device.

7. The vehicle of claim 6, wherein the controller is manually operated by a user.

8. The vehicle of claim 6, wherein the controller is automated by a control system receiving input from a temperature sensor reading a temperature of the passenger compartment.

9. The vehicle of claim 6, wherein the vehicle comprises propulsive electrical motors configured to drive wheels of the vehicle, and wherein the battery is configured to power the propulsive electrical motors.

10. The vehicle of claim 5, further comprising a controller configured to control an opacity of the switchable glass layer.

11. The vehicle of claim 5, further comprising a second switchable glass layer, wherein the second switchable glass layer is powered by the plurality of capacitors.

12. The vehicle of claim 5, wherein the vehicle includes a plurality of passenger compartment apertures; and wherein the switchable glass system is located in each of the plurality of passenger compartment apertures.

13. The vehicle of claim 12, wherein at least one passenger compartment apertures of the plurality of passenger compartment apertures is a door window of the vehicle.

14. The vehicle of claim 12, wherein at least one passenger compartment apertures of the plurality of passenger compartment apertures is a roof of the vehicle.

15. The vehicle of claim 12, wherein at least one passenger compartment apertures of the plurality of passenger compartment apertures is a rear windshield.

16. The vehicle of claim 12, wherein each of the plurality of passenger compartment apertures further comprises a controller configured to control an opacity of each of the switchable glass layer of passenger compartment apertures.

* * * * *